(12) United States Patent
Eipper

(10) Patent No.: US 6,247,344 B1
(45) Date of Patent: Jun. 19, 2001

(54) METHOD OF PRODUCING A HOLLOW PROFILE WITH FLANGE

(75) Inventor: Konrad Eipper, Rottenburg (DE)

(73) Assignee: DaimlerChrysler AG (DE)

( * ) Notice: Subject to any disclaimer, the term of this patent is extended or adjusted under 35 U.S.C. 154(b) by 0 days.

(21) Appl. No.: 09/493,425

(22) Filed: Jan. 29, 2000

(30) Foreign Application Priority Data

Feb. 10, 1999 (DE) .............................................. 199 05 365

(51) Int. Cl.⁷ .................................................. B21D 26/02
(52) U.S. Cl. .................... 72/61; 72/62; 72/370.22
(58) Field of Search .................... 72/52, 181, 58, 72/61, 62, 370.22

(56) References Cited

U.S. PATENT DOCUMENTS

| | | | |
|---|---|---|---|
| 4,563,230 | * | 1/1986 | Nocivelli .................................... 72/58 |
| 5,070,717 | * | 12/1991 | Boyd et al. ................................ 72/58 |
| 5,561,902 | * | 10/1996 | Jacobs et al. ............................. 72/61 |
| 5,823,034 | * | 10/1998 | Nelepovitz ................................ 72/60 |

FOREIGN PATENT DOCUMENTS

| | | | | |
|---|---|---|---|---|
| 525415 | * | 1/1954 | (BE) | ........................................ 72/62 |
| 1925014 | * | 11/1970 | (DE) | ........................................ 72/62 |
| 4214557 | * | 11/1993 | (DE) | ........................................ 72/61 |
| 44 25 984 A1 | | 1/1996 | (DE) | . |
| 195 05 364 A1 | | 8/1996 | (DE) | . |
| 8-168814 | * | 7/1996 | (JP) | . |
| 1212654 | * | 2/1986 | (SU) | ........................................ 72/62 |

* cited by examiner

*Primary Examiner*—David Jones
(74) *Attorney, Agent, or Firm*—Mark P. Calcaterra

(57) ABSTRACT

The invention concerns a method of producing a hollow profile with flange. To produce a hollow profile with flange in a simple way and to the requirements of the process, on which profile great enlargements and/or dimensional changes in cross section have to be performed with respect to an initial form to achieve the desired final form, it is proposed first of all to roll-form an initial hollow profile with flange from a sheet bar, which flange is formed by ends of the sheet bar lying parallel against each other, the initial hollow profile having a smaller cross-sectional area and a longer flange than the final form of the hollow profile. After that, the initial hollow profile is shaped into the final form of the hollow profile by exerting a fluidic internal high pressure.

19 Claims, 1 Drawing Sheet

METHOD OF PRODUCING A HOLLOW PROFILE WITH FLANGE

I. FIELD OF THE INVENTION

Figure 1:
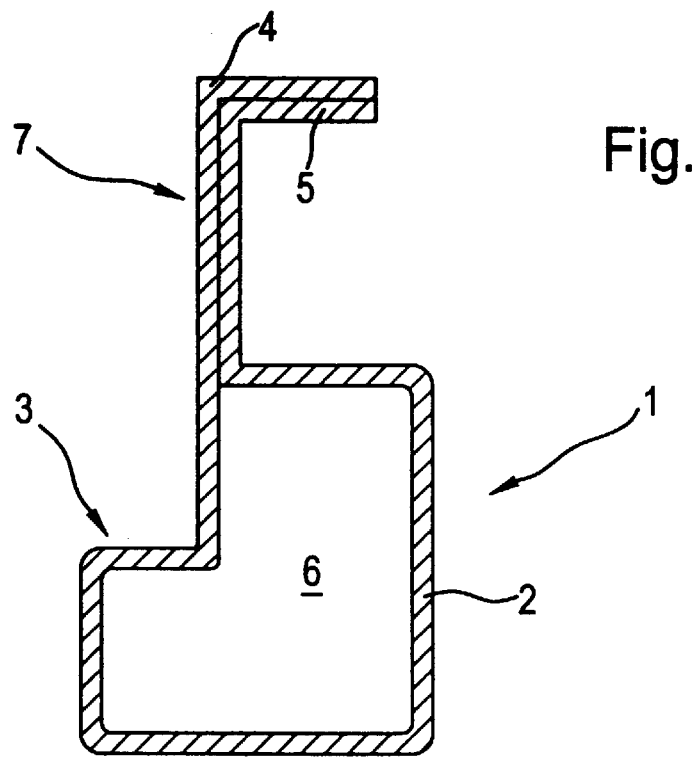

The present invention relates generally to a a method of producing a hollow profile with flange. and more particular to a method of producing a hollow profile with a flange from an initial hollow profile by exerting a fluidic internal high pressure.

II. BACKGROUND OF THE INVENTION

Conventional hollow profiles with flange are generally extruded. In automobile construction, the flange is in this case used for joining the hollow profile to further parts of the vehicle. An extruded hollow profile with flange has the disadvantage, however, that the hollow profile can be bent and/or expanded only with great difficulty, since on the one hand the root of the flange on the hollow profile—also referred to as the junction—acts almost as it were like a tie bar against the shaping force and on the other hand the material accumulation at this junction and the flange itself do not allow adequate expansions for shaping reliably to the requirements of the process. To do so in the case of an enlargement in cross section, the material required for this change would have to be taken completely from the region underneath the junction. On account of the increased extent to which the wall is made thinner as a result, leading quickly to failure of the component during shaping, this considerably restricts the degree of enlargement.

It is known from DE 195 05 364 A1 in the case of a hollow profile for a motor vehicle body to integrate functional parts such as a guide rail or a thickened running surface by roll-forming the hollow profile from a sheet bar.

The invention is based on the object of presenting a method by means of which a hollow profile with flange can be produced in a simple way to the requirements of the process, on which profile great enlargements and/or dimensional changes in cross section have to be performed with respect to an initial form to achieve the desired final form.

The present invention is aimed at one or more of the problems identified above.

III. SUMMARY OF THE INVENTION

The invention is based on the object of presenting a method by means of which a hollow profile with flange can be produced in a simple way to the requirements of the process, on which profile great enlargements and/or dimensional changes in cross section have to be performed with respect to an initial form to achieve the desired final form.

Thanks to the invention, non-expandable junctions, as in the case of extruded profiles, are avoided. In addition to the simple forming of flange shapes of any desired design on a hollow profile, the technique of roll-forming used for this purpose brings about a significant improvement in the bending of a hollow profile with flange. By means of fluidic internal high-pressure shaping, not only the expanding action but also very exactly contoured circumferential surfaces and high-quality surface finishes are obtained for shaping the hollow profile, it generally being possible at the same time to accomplish high degrees of shaping by the flowing of the sheet material achieved under the high pressure and its substantially uniform material flow. The hydraulic expansion of the initial hollow profile with flange into the final form is only made possible to the requirements of the process by the use of a roll-formed initial hollow profile, since the preformed flange, which comprises two separate layers of sheet metal due to the roll-forming, no longer represents an obstacle for the expansion of the hollow profile, so that part of the flange is spread open during expansion and the flange in its final form is shortened in comparison with the initial form. With the initial flange of the roll-formed initial hollow profile designed to a suitable length together with the internal high-pressure shaping technique, it is consequently possible to achieve virtually any desired final hollow profile form in which—starting from an initial hollow profile of small cross-sectional area—even relatively great expansions and/or dimensional changes in cross section are required locally, seen over the entire extent of the hollow profile.

IV. BRIEF DESCRIPTION OF THE DRAWINGS

Figure 2:
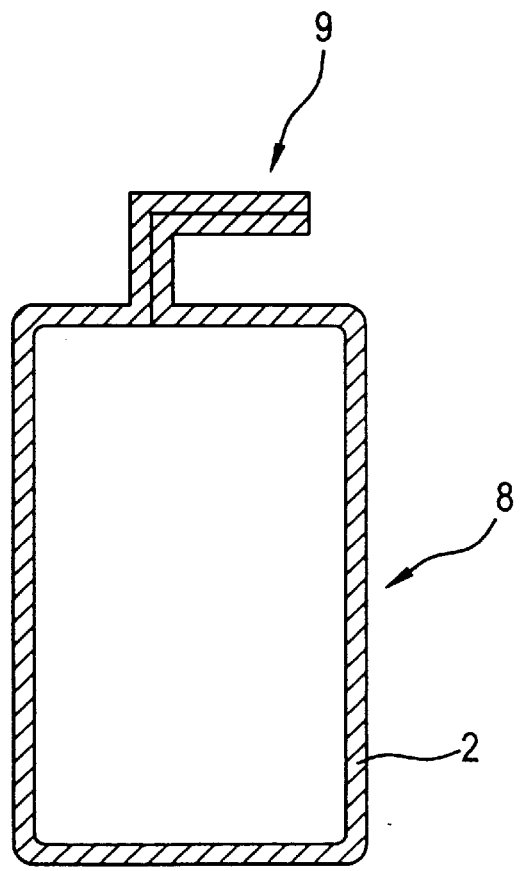

The invention is explained in more detail below on the basis of exemplary embodiments and is represented in the drawing, in which:

FIG. 1 shows a cross section of an initial hollow profile with flange, roll-formed according to the invention, FIG. 2 shows the cross section from FIG. 1 after the internal high-pressure shaping operation.

V. DETAILED DESCRIPTION OF THE INVENTION

Represented in FIG. 1 is an initial hollow profile 1, which comprises a roll-formed sheet bar 2. The sheet bar 2 has been rolled in such a way that the otherwise rectangular hollow profile 1 has a step 3 on its left-hand half. The two ends 4, 5 of the bar 2, lying against each other above the hollow profile 1 and consequently forming a closed hollow profile space 6, form a hook-shaped flange 7. The step 3 has the effect that the hollow profile 1 is largely adapted to the surrounding constructional space along its extent. If, however, an enlargement in cross section and/or change in cross-sectional shape is required locally, a fluidic high pressure is generated in the hollow profile space 6, by means of which the initial hollow profile 1 is expanded at this point into the desired final hollow profile form 8, as FIG. 2 shows.

In this exemplary embodiment, the step 3 is made to bulge by the internal high pressure and the ends 4, 5 of the bar 2 are drawn apart in the region directly adjacent to the hollow profile space 6, resulting in a hollow profile in the form of a regular rectangle which, although it becomes narrower in comparison with the initial hollow profile 1, has an enlarged cross-sectional area and a hook-shaped flange 9 that has been greatly shortened in comparison with the initial flange 7. The step 3 represents almost as it were a material store, which is used for the expansion into the final form 8 of greater cross-sectional area, to compensate for the thinning of the material thereby taking place, which further enhances the compliance of the expanding operation to process requirements and consequently the production of the final hollow profile form 8.

The idea of providing a material store for improving the expandability of the hollow profile 1 to the requirements of the process can be advantageously taken a stage further by the sheet bar 2 being rolled in such a way that, instead of the step 3, one of the two halves of the preform of the hollow profile 1, which are vertically separated from each other, is formed in a loop-like manner underneath the flange 7. The loops in this case form the material store, their number and length determining the degree of possible expansion. In this respect it should certainly also be noted that the loops must be wide enough and not too long, so that the loops can be pressed out by the high hydraulic pressure.

The possibilities for application of the invention are universal. In particular, the vehicle body sector must be mentioned in this respect, preferably the longitudinal members at the front, rear and sides, the A, B and C pillars, transverse members, roof frames and the vehicle floor. The invention can also be advantageously used for lightweight vehicle construction, since materials which, although lightweight, also have only low ductility, such as aluminium alloys for example, also have improved shaping properties in the form of a rolled hollow profile.

What is claimed is:

1. A method of forming a hollow tubular structure, the method comprising the steps of:

providing a generally planar workpiece;

roll forming the workpiece to define an intermediate product having an initial closed section, and an initial flange portion constructed of two adjacently disposed ends of the workpiece interconnected to the initial closed section; and applying a fluidic pressure to the initial closed section to create a final product having a final closed section and a final flange portion, the final closed section having a significantly larger perimeter than the initial closed section.

2. The method of forming a hollow tubular structure of claim 1, wherein the step of roll forming the workpiece defines the initial flange portion having a "L"-shape.

3. The method of forming a hollow tubular structure of claim 1, wherein the final closed section is generally rectangular.

4. The method of forming a hollow tubular structure of claim 1, wherein the final flange portion has a significantly decreased length as compared to the initial flange portion.

5. The method of forming a hollow tubular structure of claim 1, wherein the initial closed section is six-sided.

6. The method of forming a hollow tubular structure of claim 1, wherein the step of applying a fluidic pressure includes the step of providing a hydraulic pressure.

7. A method of forming a motor vehicle component having a hollow tubular structure, the method comprising the steps of:

providing a generally planar workpiece;

roll forming a generally planar workpiece to define an intermediate product having an initial closed section and an initial flange portion, the initial closed section partially defined by an inwardly extending portion; and applying a fluidic pressure to the initially closed section to create a final product having a final closed section and a final flange portion.

8. The method of forming a motor vehicle component having a hollow tubular structure of claim 7, wherein the step of roll forming the workpiece defines the initial flange portion to be generally "L"-shaped.

9. The method of forming a motor vehicle component having a hollow tubular structure of claim 7, wherein the final closed section is generally rectangular.

10. The method of forming a motor vehicle component having a hollow tubular structure of claim 7, wherein the final flange portion has a significantly decreased length as compared to the initial flange portion.

11. The method of forming a motor vehicle component having a hollow tubular structure of claim 7, wherein the initially closed cross section is six-sided.

12. The method of forming a motor vehicle component having a hollow tubular structure of claim 7, wherein the step of providing a fluidic pressure includes the step of providing hydraulic pressure.

13. A method of forming a hollow tubular structure, the method comprising the steps of:

providing a generally planar workpiece;

roll forming the generally planar workpiece to define an intermediate product having an initial flange portion and an initial closed section, the closed section having a material store; and applying a fluidic pressure to the initially closed section to create a final product having a final closed section and a final flange portion by drawing material for the final closed section from the material store.

14. The method of forming a hollow tubular structure of claim 13, wherein a portion of the workpiece defining the initial flange portion defines a portion of the final closed section.

15. The method of forming a hollow tubular structure of claim 13, wherein the step of roll forming the workpiece defines the initial flange portion to be generally "L"-shaped.

16. The method of forming a hollow tubular structure of claim 13, wherein the final closed section is generally rectangular.

17. The method of forming a hollow tubular structure of claim 13, wherein the final flange portion has a significantly decreased length as compared to the initial flange portion.

18. The method of forming a hollow tubular structure of claim 13, wherein the step of providing a fluidic pressure includes the step of providing hydraulic pressure.

19. The method of forming a hollow tubular structure of claim 13, wherein the step of applying a fluidic pressure further draws material for the final closed section from the initial flange portion.

* * * * *